(12) United States Patent
Hara et al.

(10) Patent No.: US 9,210,297 B2
(45) Date of Patent: Dec. 8, 2015

(54) METHOD FOR DETERMINING COLOR CORRECTION PARAMETER FOR RECORDING APPARATUS

(75) Inventors: Katsushi Hara, Yokohama (JP); Naoko Baba, Kawasaki (JP); Hajime Nagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 13/360,056

(22) Filed: Jan. 27, 2012

(65) Prior Publication Data

US 2012/0194833 A1   Aug. 2, 2012

(30) Foreign Application Priority Data

Jan. 28, 2011   (JP) .................................. 2011-016349

(51) Int. Cl.
 *G06F 15/00* (2006.01)
 *H04N 1/60* (2006.01)
(52) U.S. Cl.
 CPC .................................. *H04N 1/6036* (2013.01)
(58) Field of Classification Search
 CPC .............................. H04N 1/6036; G06F 15/00
 USPC ........................................ 358/1.9, 1.13–1.19
 See application file for complete search history.

(56) References Cited

U.S. PATENT DOCUMENTS

| 6,224,190 | B1 * | 5/2001 | Sato et al. | 347/43 |
|---|---|---|---|---|
| 6,390,583 | B1 * | 5/2002 | Kato et al. | 347/15 |
| 7,551,315 | B2 * | 6/2009 | Hoshii et al. | 358/1.2 |
| 7,646,507 | B2 * | 1/2010 | Ono | 358/1.9 |
| 7,782,482 | B2 * | 8/2010 | Tanaka | 358/1.9 |
| 2004/0207862 | A1 * | 10/2004 | Such et al. | 358/1.9 |
| 2007/0019258 | A1 * | 1/2007 | Hattori | 358/518 |
| 2008/0043266 | A1 * | 2/2008 | Misumi et al. | 358/1.9 |
| 2009/0290180 | A1 * | 11/2009 | Onoda | 358/1.9 |
| 2010/0157337 | A1 * | 6/2010 | Akado et al. | 358/1.9 |
| 2012/0081449 | A1 * | 4/2012 | Kagawa et al. | 347/19 |

FOREIGN PATENT DOCUMENTS

| JP | 2004-358965 A | 12/2004 |
|---|---|---|
| JP | 2005-268832 A | 9/2005 |
| JP | 2006-168139 A | 6/2006 |
| JP | 2007-193055 A | 8/2007 |

\* cited by examiner

*Primary Examiner* — Marivelisse Santiago Cordero
*Assistant Examiner* — Kevin Ky
(74) *Attorney, Agent, or Firm* — Canon USA, Inc., IP Division

(57) ABSTRACT

From a cost and productivity perspective, the recording and color-measurement of a test pattern to determine whether it is necessary to execute calibration places a heavy burden on a user. The present invention determines the need for processing to generate a color correction parameter without recording a test pattern. More specifically, the present invention determines whether it is necessary to execute color correction parameter generation processing based on an increase in a dot count since color correction parameter generation processing was previously executed, or a change in a ejection rate.

21 Claims, 18 Drawing Sheets

FIG. 7

| | BK | MBK | C | M | Y | PC | PM |
|---|---|---|---|---|---|---|---|
| DEPLETION LEVEL 1: LESS THAN $5.0 \times 10^{11}$ | 4 | 6 | 4 | 4 | 4 | 2 | 2 |
| DEPLETION LEVEL 2: $5.0 \times 10^{11}$ OR MORE AND LESS THAN $5.0 \times 10^{12}$ | 10 | 20 | 10 | 10 | 20 | 4 | 4 |
| DEPLETION LEVEL 3: $5.0 \times 10^{12}$ OR MORE | 6 | 10 | 6 | 6 | 10 | 2 | 2 |

UNITS : $\times 10^{11}$ COUNT

FIG. 8A

| BK | MBK | C | M | Y | PC | PM |
|----|-----|---|---|---|----|----|
| 21 | 3 | 18 | 28 | 53 | 60 | 55 |

UNITS : X$10^{11}$ COUNT

FIG. 8B

| BK | MBK | C | M | Y | PC | PM |
|----|-----|---|---|---|----|----|
| 10 | 1 | 9 | 14 | 26 | 30 | 27 |

UNITS : X$10^{11}$ COUNT

FIG. 9A

| BK | MBK | C | M | Y | PC | PM |
|----|-----|---|---|---|----|----|
| 2  | 1   | 2 | 2 | 3 | 3  | 3  |

UNITS : X$10^{11}$ COUNT

FIG. 9B

| BK | MBK | C | M | Y | PC | PM |
|----|-----|---|---|---|----|----|
| 2  | 1   | 2 | 2 | 2 | 2  | 2  |

UNITS : X$10^{11}$ COUNT

FIG. 10A

| BK | MBK | C | M | Y | PC | PM |
|---|---|---|---|---|---|---|
| 1.2 | 0.4 | 1.0 | 1.5 | 3.2 | 2.2 | 1.9 |

UNITS : X$10^{11}$ COUNT

FIG. 10B

| BK | MBK | C | M | Y | PC | PM |
|---|---|---|---|---|---|---|
| 0.6 | 0.2 | 0.5 | 0.7 | 1.6 | 1.1 | 0.9 |

UNITS : X$10^{11}$ COUNT

FIG. 12

RECOMMENDED TO PERFORM COLOR CALIBRATION

FIG. 14

| BK | MBK | C | M | Y | PC | PM |
|----|-----|---|---|---|----|----|
| 2  | 2   | 2 | 2 | 1 | 1  | 1  |

UNITS : m/sec

FIG. 15A

| BK | MBK | C | M | Y | PC | PM |
|---|---|---|---|---|---|---|
| 15 | 16 | 15 | 15 | 16 | 15 | 16 |

UNITS : m/sec

FIG. 15B

| BK | MBK | C | M | Y | PC | PM |
|---|---|---|---|---|---|---|
| 15 | 16 | 15 | 15 | 16 | 16 | 16 |

UNITS : m/sec

FIG. 16A

| BK | MBK | C | M | Y | PC | PM |
|---|---|---|---|---|---|---|
| 0.8 | 0.4 | 0.8 | 0.7 | 0.8 | 1.1 | 0.7 |

UNITS : m/sec

FIG. 16B

| BK | MBK | C | M | Y | PC | PM |
|---|---|---|---|---|---|---|
| 0.4 | 0.2 | 0.4 | 0.3 | 0.4 | 0.5 | 0.3 |

UNITS : m/sec

FIG. 18

| | BK | MBK | C | M | Y | PC | PM |
|---|---|---|---|---|---|---|---|
| DEPLETION LEVEL 1: LESS THAN $5.0 \times 10^{11}$ | 1 | 1 | 1 | 1 | 1 | 0.5 | 0.5 |
| DEPLETION LEVEL 2: $5.0 \times 10^{11}$ OR MORE AND LESS THAN $5.0 \times 10^{12}$ | 2 | 4 | 2 | 2 | 4 | 1 | 1 |
| DEPLETION LEVEL 3: $5.0 \times 10^{12}$ OR MORE | 1 | 2 | 1 | 1 | 2 | 0.5 | 0.5 |

UNITS : $\times 10^{11}$ COUNT

METHOD FOR DETERMINING COLOR CORRECTION PARAMETER FOR RECORDING APPARATUS

BACKGROUND OF THE INVENTION

1. Field of the Invention

The present invention relates to a method for determining a color correction parameter for a recording apparatus that has a color calibration function.

2. Description of the Related Art

Recently, an inkjet recording apparatus always needs to output a stable color print. Consequently, many inkjet recording apparatuses having a color calibration function are known.

Color calibration is a process in which image data is corrected by suppressing variation in the color of an image recorded by a recording head, and generating a color correction parameter for recording an assumed reference color (target color) for a printer that is always in a stable state.

For example, the recording apparatus outputs on a recording medium a test pattern that includes a color patch for measurement, and acquires information about the color of the image to be recorded by the recording head by measuring that color patch. Then, the recording apparatus generates the color correction parameter so that the reference color is recorded based on the acquired information.

Color variation can be suppressed by using this color correction parameter to correct the image data. Previously, an inkjet recording apparatus has been proposed that compares the measurement value obtained by measuring the recorded test pattern with an internally-stored reference value, determines whether it is necessary to execute color calibration based on that comparison result, and notifies a user of that determination result.

However, to generate the color correction parameter to be used for calibration, the recording medium and ink are consumed in order to record the test pattern. In addition, the measurement takes time. Consequently, from the perspective of costs and productivity, performing calibration places a large burden on the user.

Japanese Patent Application Laid-Open No. 2005-268832 discusses a technology which determines whether it is necessary to generate a color correction parameter, or if a color correction parameter was generated in the past, whether it is necessary to regenerate the color correction parameter, by comparing a measurement value with the value of an internally-stored reference color.

This technology enables color variation to be suppressed while also reducing the number of recordings and measurements of the test pattern. However, since a test pattern is recorded and measured in order to determine whether the color correction parameter needs to be generated, from a cost and productivity perspective, a sufficient reduction in the burden placed on the user is not achieved.

SUMMARY OF THE INVENTION

The present invention is directed to a method for determining a color correction parameter for a recording apparatus, and determining whether it is necessary to generate a color correction parameter used for calibration without consuming a recording medium or ink. Consequently, color variation can be suppressed while improving user costs and productivity, and while reducing to a minimum the number of recordings and color measurements of a test pattern for calibration.

According to an aspect of the present invention, a method for generation of a color correction parameter for a recording apparatus that records an image on a recording medium using a recording head that includes a plurality of ejection ports, includes inputting information instructing determination of whether it is necessary to execute color correction parameter generation processing, acquiring information about a number of ink droplets that have been ejected from the plurality of ejection ports of the recording head during a period from execution of the previous generation processing until the information instructing determination is input, and determining whether it is necessary to execute the generation processing based on the acquired information about the number of ink droplets.

The present invention can provide an inkjet recording apparatus capable of suppressing color variation while reducing the number of recordings and color measurements of a test pattern and improving costs and productivity, by determining whether it is necessary to generate a color correction parameter to be used for calibration without consuming a recording medium or ink.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is an ejection count threshold table.

FIGS. 8A and 8B illustrate a sum of the number of ejects (hereinafter "sum ejection number") when calibration was previously executed.

FIGS. 9A and 9B illustrate recording head depletion level determination results.

FIGS. 10A and 10B illustrate an increase in the ejection number since the previous calibration.

FIG. 12 illustrates a user notification screen.

FIG. 14 is an ejection rate difference threshold table.

FIGS. 15A and 15B illustrate an ink ejection rate.

FIGS. 16A and 16B each illustrate an ejection rate difference since the previous calibration.

FIG. 18 is an ejection rate detection timing threshold table.

DESCRIPTION OF THE EMBODIMENTS

Various exemplary embodiments, features, and aspects of the invention will be described in detail below with reference to the drawings.

Figure 1:
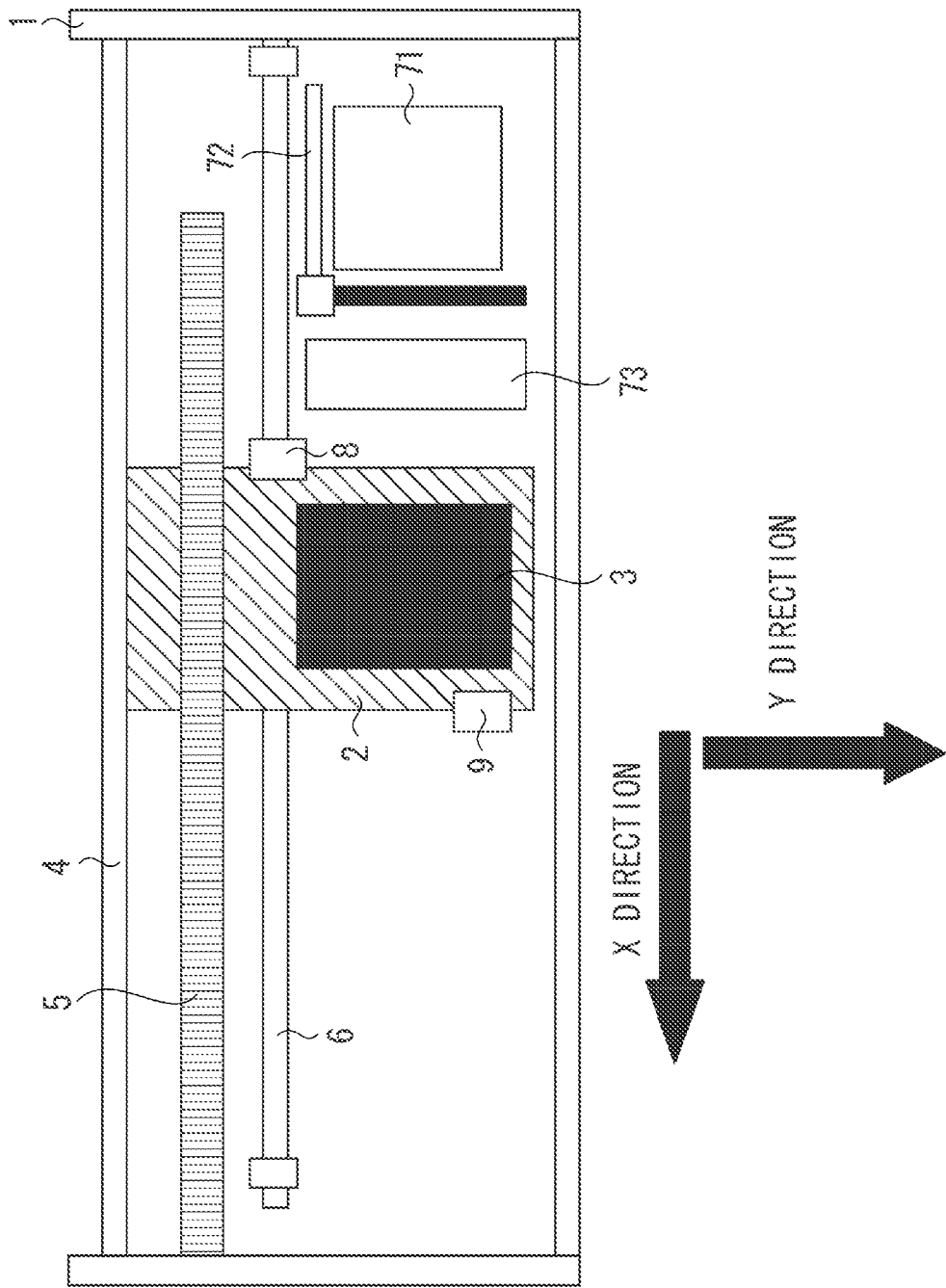
FIG. 1 is a planar view of an inkjet recording apparatus according to a first exemplary embodiment.

FIG. 1 is a planar view of an inkjet recording apparatus according to a first exemplary embodiment. A recording apparatus body 1 has various mechanism units, including a recording paper (recording medium) conveyance unit (not-illustrated). The inkjet recording apparatus is configured from this recording apparatus body 1 and a below-described control system mounted therein.

The inkjet recording apparatus according to the present exemplary embodiment performs a recording operation while intermittently conveying a recording medium in a Y direction (sub-scanning direction) with a conveyance system unit, and moving a recording head 3 in an X direction (main scanning direction), which is orthogonal to the Y direction. In other words, this inkjet recording apparatus is a serial inkjet recording apparatus. Further, the recording apparatus body 1 has an increased size in the X direction so that it can perform recording on comparatively large-format recording media (e.g., A0 size).

In FIG. 1, the recording head 3 is mounted on a carriage 2, which reciprocatingly moves in a direction orthogonal to the Y direction along which the recording medium is conveyed. The carriage 2 is movably supported along a guide shaft 4 arranged in the X direction. Further, the carriage 2 is fixed to an endless belt 5 that moves roughly parallel to the guide shaft 4. The carriage 2 is reciprocatingly moved in the X direction due to the reciprocating movement of the endless belt 5 by a drive force from a carriage motor (CR motor).

Although the present exemplary embodiment is described using a mode in which the recording head scans the recording medium, the present invention is not limited to this. For example, the recording medium may be conveyed toward a fixed recording head. In other words, the recording may be performed while the recording medium and the recording head are moved relative to each other.

The carriage 2 also includes a carriage elevation mechanism 8 that raises and lowers the carriage 2. Further, the carriage 2 includes a color sensor 9 for measuring a color patch and detecting the recording medium.

The recording apparatus also includes a recovery treatment apparatus to maintain ink ejection in a good state from each of the plurality of ejection ports included in the recording head 3. This recovery treatment apparatus, which is held and fixed at a predetermined position on the recording apparatus body 1, includes a suction recovery mechanism 71, a wiping recovery mechanism 72, and a pre-ejection ink receptacle 73.

The position of the carriage 2 is detected by a below-described main control unit 200 counting pulse signals that are output from an encoder sensor 215 when the carriage 2 moves.

More specifically, the encoder sensor 215 outputs a pulse signal to the main control unit 200 by detecting a detection portion that is formed at a fixed interval on an encoder film 6 arranged in the main scanning direction. The main control unit 200 detects the position of the carriage 2 by counting this pulse signal. Movement to the home position of the carriage 2 and to other positions is performed based on a signal from the encoder sensor 215.

The recording head 3 is configured from seven recording chips, so that it can eject seven colors: black (BK), matte black (MBK), cyan (C), photo cyan (PC), magenta (M), photo magenta (PM), and yellow (Y), respectively.

Each recording chip has 1,280 ejection ports that are aligned in a staggered arrangement at a density of 1,200 dpi (dots/inch). Two of these staggered rows are provided on each recording chip, so that each recording chip has 2,560 ejection ports. The whole recording apparatus records in the above 7 colors using a total of 17,920 ejection ports, which are arranged in 7 rows in the main scanning direction and 2,560 ports arranged at a density of 1,200 dpi in the sub-scanning direction.

The recording head 3 includes energy generating elements which generate ejection energy to eject ink from the ejection ports. In the present exemplary embodiment, as this energy generating element, an electrothermal converter is employed. This electrothermal converter locally heats ink to cause film boiling, and the pressure generated from the film boiling is used to eject the ink. However, the present invention is not limited to this. Some other elements, such as an electromechanical conversion element, can also be employed.

Figure 2:
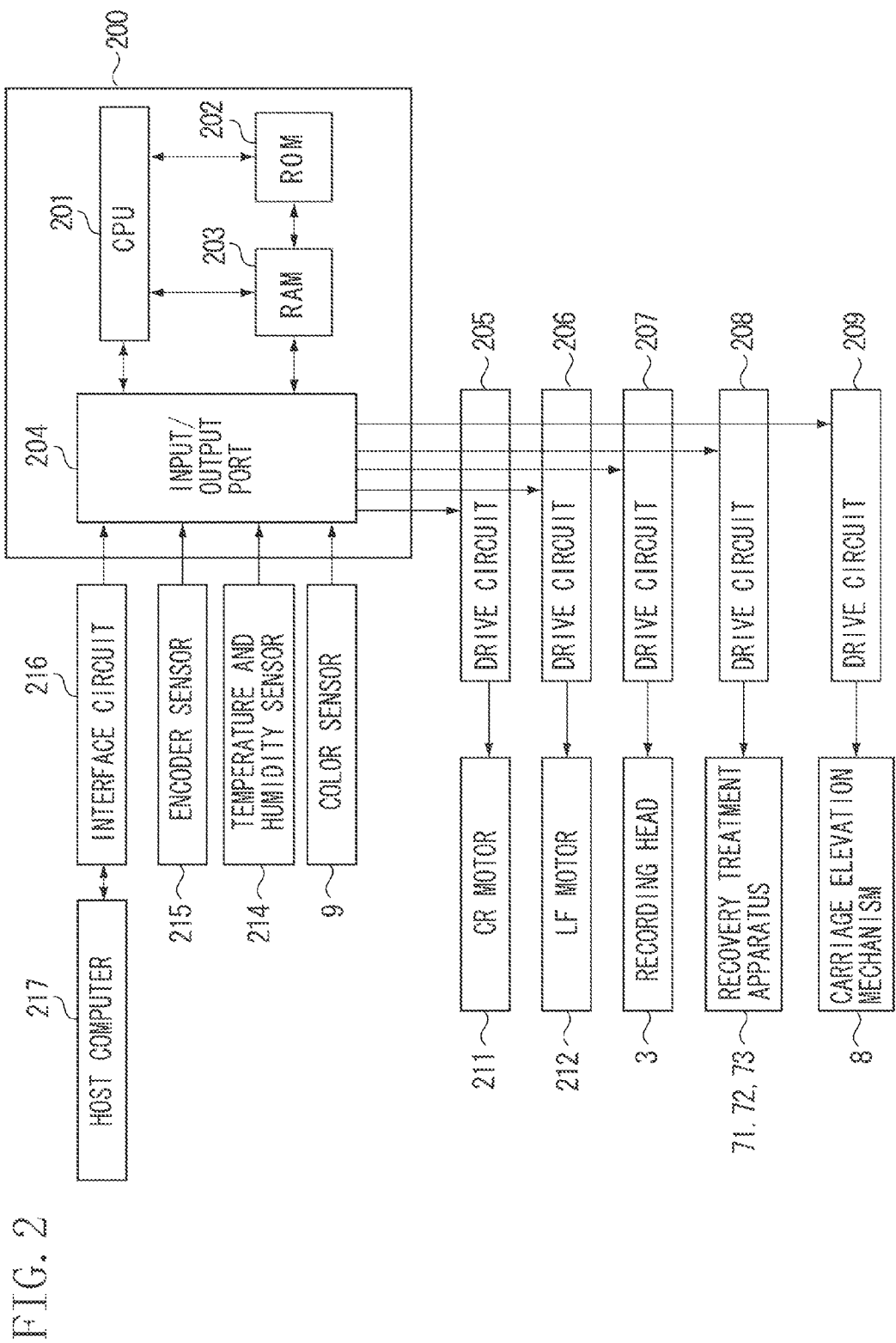
FIG. 2 is a block diagram illustrating a configuration of a control system.

FIG. 2 is a block diagram illustrating a configuration of a control system (control unit) mounted in the recording apparatus body 1 according to the present exemplary embodiment. In FIG. 2, the main control unit 200 includes a central processing unit (CPU) 201, a read-only memory (ROM) 202, a random access memory (RAM) 203, and an input/output port 204. The CPU 201 executes processing operations such as calculation, control, determination, and setting.

The ROM 202 stores control programs that are executed by the CPU 201. The RAM 203 is used as a buffer for storing binary recording data representing ejection/non-ejection of ink, and as a work area for processing performed by the CPU 201.

The input/output port 204 is connected to drive circuits 205, 206, 207, 208, and 209, which respectively correspond to a carriage (CR) motor 211, a conveyance (LF) motor 212, the recording head 3, the recovery treatment apparatuses 71 to 73, and the carriage elevation mechanism 8, which are in the conveyance unit. Further, the input/output port 204 is connected to various sensors, such as the color sensor 9 that is used for measurement of color patches and detection of the recording medium, a temperature and humidity sensor 214 that detects the temperature and humidity of the surrounding environment, and an encoder sensor 215 that is fixed to the carriage 2.

The main control unit 200 is connected to a host computer 217 via an interface circuit 216.

Next, the recording operation executed by the inkjet recording apparatus having the above configuration will be described.

When recording data is received from the host computer 217 via the interface, the recording data is rasterized in the RAM 203 buffer. When a recording operation instruction is received, the carriage 2 reciprocatingly moves the mounted recording head 3 parallel to the guide shaft 4 with a (not-illustrated) carriage motor and the endless belt 5.

Simultaneously with this operation, the recording head 3 ejects ink from the ejection ports to form a nozzle-width amount of the image. Next, the recording medium is conveyed a fixed amount in the sub-scanning direction. These operations are repeated to form the image.

Figure 3:
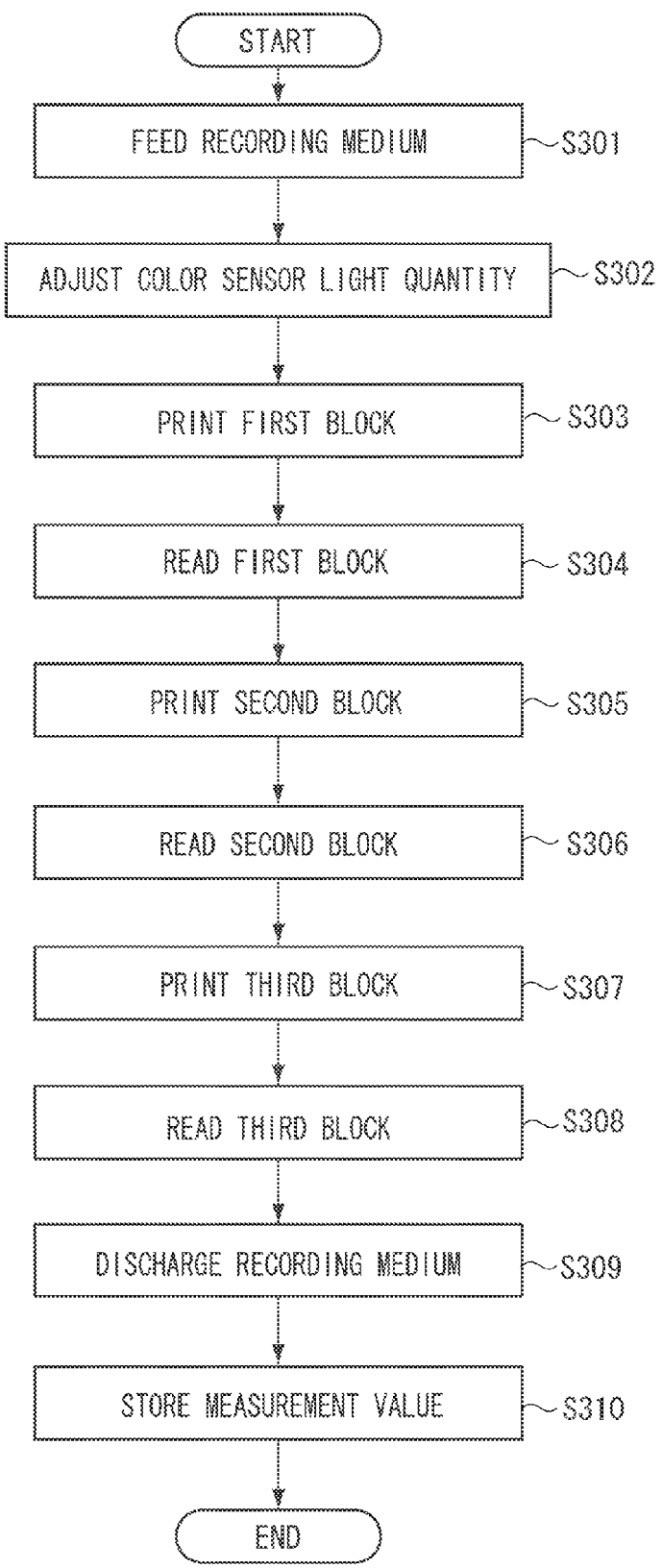
FIG. 3 is a flowchart illustrating color measurement of a test pattern for color calibration.

FIG. 3 illustrates a color-measurement flow for executing calibration according to the present exemplary embodiment. In step S301, the recording medium on which color calibration is to be performed is set. In step S302, the light quantity of the color sensor 9 is adjusted in order to measure the test pattern. In step S303, a first block of an output patch for calibration is printed.

Figure 4:
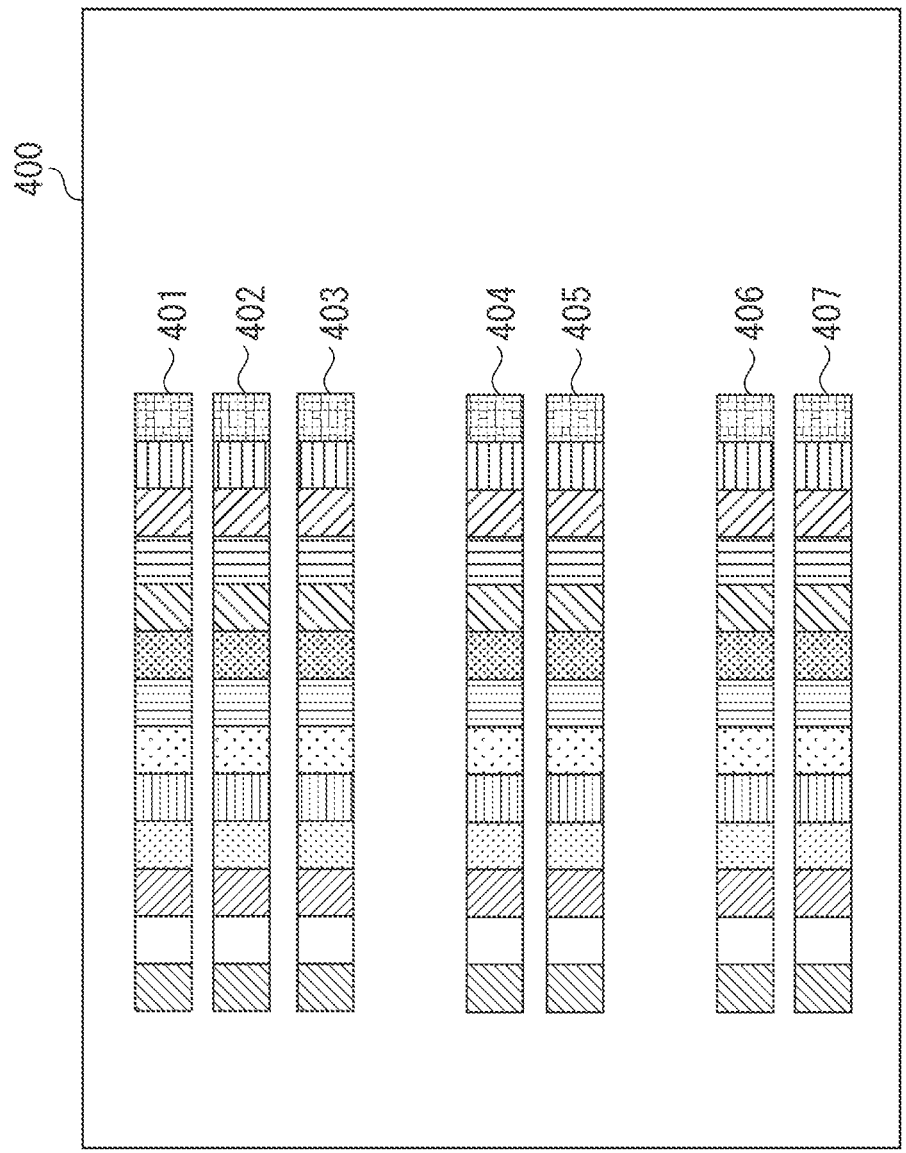
FIG. 4 illustrates a test pattern for color calibration.

FIG. 4 illustrates a configuration of a test pattern 400 for color calibration.

The first block is configured from three color patches, a matte black ink patch 401, a black ink patch 402, and a yellow ink patch 403, and each color patch is configured from 13 tones. In step S304, the first block of the test pattern is measured by the color sensor 9.

In step S305, the second block of the test pattern for color calibration is printed. The second block is configured from two color patches, a photo magenta ink patch 404 and a magenta ink patch 405, each of which is configured from 13 tones.

In step S306, the second block is measured by the color sensor 9. In step S307, the third block of the test pattern for color calibration is printed. The third block is configured from two color patches, a photo cyan ink patch 406 and a cyan ink patch 407, each of which is configured from 13 tones.

In step S308, the third block is measured by the color sensor 9. In the present exemplary embodiment, although the color sensor 9 acquires red, green, and blue (RGB) values as the measurement values, the color sensor 9 may also acquire other values, such as cyan, magenta, yellow, and black (CMYK) values, L*a*b* values, or XYZ values. Since at this point the outputs and the measurements necessary for color calibration have been completed, in step S309, the recording medium is ejected. Finally, in step S310, the measurement values, which are the measurement results, are stored and the processing is finished.

Figure 5:
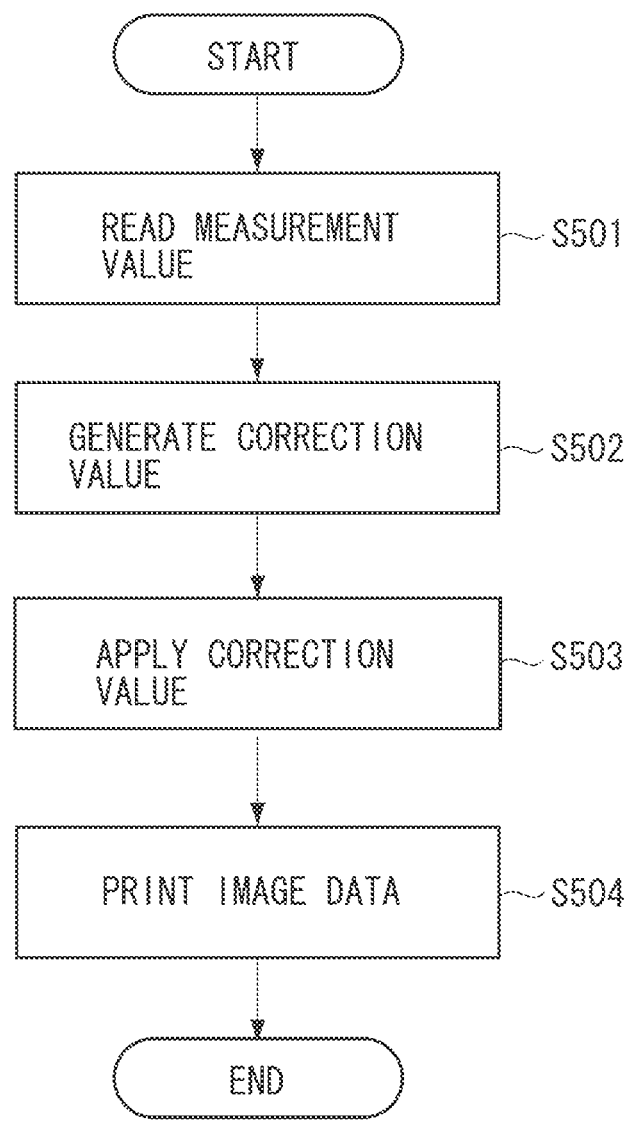
FIG. 5 is a flowchart illustrating printing performed by applying color calibration.

FIG. 5 illustrates a flow in which image data is recorded by applying the above-described color calibration. First, in step S501, the measurement results (measurement values) stored in the color measurement flow of FIG. 3 are read. In step S502, a color correction parameter for correcting the image data is generated.

In step S503, the input image data is corrected by applying this color correction parameter. This correction operation enables the image data to be corrected so that a reference color having a color target value is output. In step S504, the corrected image data is printed.

By continually applying the above-described color calibration as necessary, a stable image free from color variation can always be output.

Next, a flow for determining whether it is necessary to execute color correction parameter generation processing for generating a color correction parameter in order to execute calibration, which is a characteristic feature of the present exemplary embodiment, will be described. In the present exemplary embodiment, it can be internally determined whether color variation has occurred at the current time, i.e., whether it is necessary to newly generate a color correction parameter, without having to print and measure the color of a test pattern.

This determination processing is performed, for example, when the power is turned ON, when a recording head has been replaced, when a recording medium has been set in the apparatus, when a print job has finished, and when the printing of one page has finished. The method for determining whether this calibration needs to be executed will be described using the following example.

The present exemplary embodiment is characterized in that information relating to the number of ink droplets ejected from all of the ejection ports in the recording head is used to determine the need for the color correction parameter generation processing to be used in calibration.

More specifically, the recording apparatus includes a count unit for counting the number of ink droplets ejected from all of the ejection ports in the recording head. This count unit determines the need for color correction parameter generation processing based on the counted ejection number up to the previous time that color correction parameter generation processing was executed.

Although this operation will be described in more detail below, the frequency that calibration is determined to be necessary is set so that it is different based on the sum count of the ejection number when the color correction parameter generation processing was previously executed.

This ejection number may be obtained by counting from the image data to be recorded, counting the number of times that the recording elements included in the recording head are driven, or counting the actual number of ejects from the ejection ports.

Figure 6:
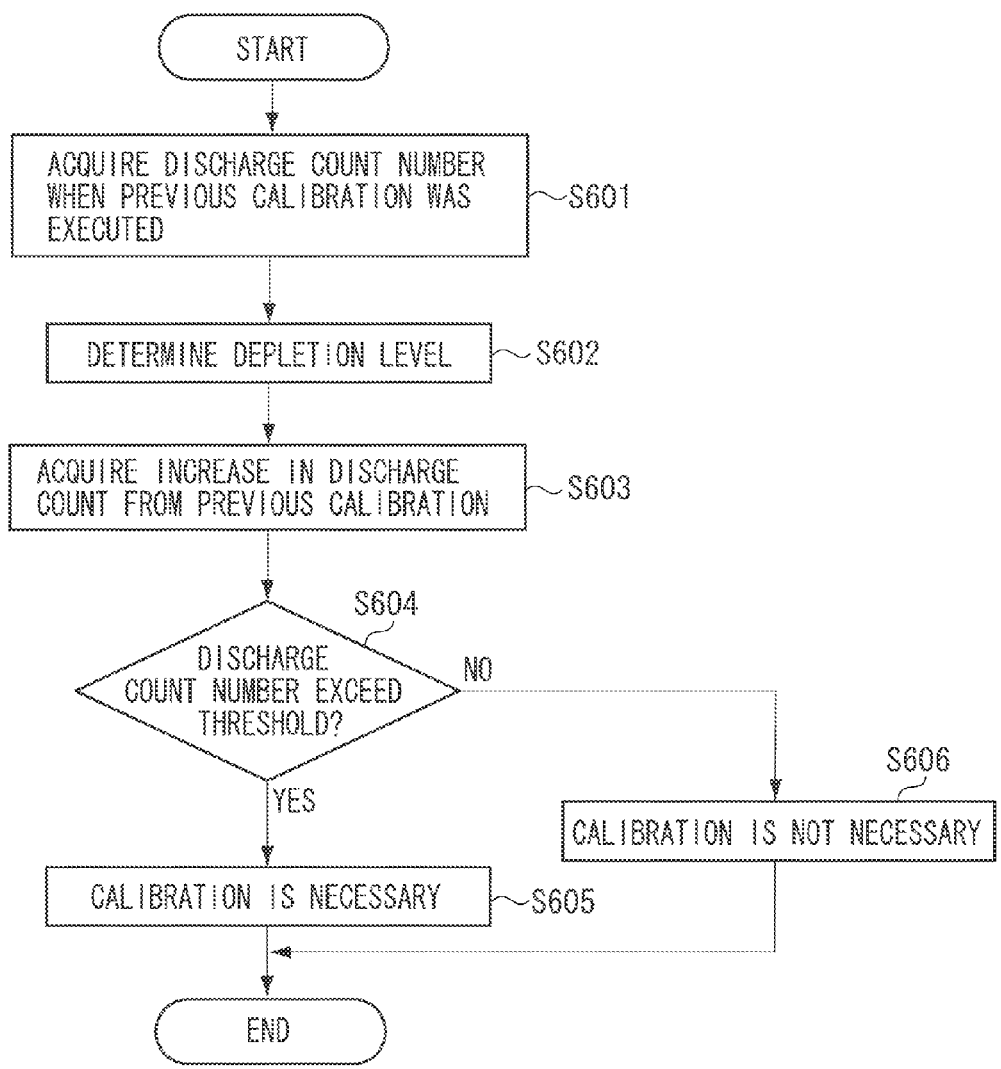
FIG. 6 is a flowchart for determining a need for calibration according to the first exemplary embodiment.

FIG. 6 is a flowchart for determining the need for color correction parameter generation processing to be used for calibration according to the present exemplary embodiment.

First, when the power is turned ON, when the recording head has been replaced, when the recording medium has been set in the apparatus, when the print job has finished, or when the printing of one page has finished, for example, a job on which this determination processing is to be performed is input, and the determination flow starts.

In step S601, the sum of the number of ink droplets (ejection number) ejected from all of the ejection ports of the recording head during the period from when the head was set in the recording apparatus body to when the job on which this determination processing is to be performed was input, and the sum ejection number when calibration was previously executed are acquired for each ink color. As an example of this, FIG. 8A illustrates the acquired sum ejection number for each ink color.

In step S602, the depletion level of the recording head is determined based on the acquired sum ejection number for each color illustrated in FIG. 8A and the ejection count threshold table illustrated in FIG. 7.

Although this operation will be described in more detail below, in the present exemplary embodiment, an increase in the ejection number from when calibration was previously executed until when this determination flow is executed is acquired. Then, the need for color correction parameter generation processing is determined by comparing this increase with a predetermined threshold.

At this stage, the ejection state (depletion level) of the recording head is determined based on the sum ejection number at the time when the previous color correction parameter was generated, which is when calibration was previously executed. By setting the threshold based on this depletion level, the accuracy for determining whether a color correction parameter needs to be generated is enhanced.

In the ejection count threshold table illustrated in FIG. 7, the depletion level of the recording head is divided into three stages, and a threshold is set for each depletion level. In the present exemplary embodiment, three stages include, "depletion level 1", which is an unstable stage before the recording head eject stabilizes, "depletion level 2", which is a stage in which ejection is stable, and "depletion level 3", which indicates that there is a high likelihood that the life of the recording head is about to run out and the recording head will become unstable. These depletion levels will be described in more detail below.

Immediately after mounting on the inkjet recording apparatus, the recording head is in a new state, in which the electrothermal converter in the recording head first comes into contact with the ink. Consequently, the ejection operation tends to vary, in which the ink is locally heated by the electrothermal converter to cause film boiling to occur.

If the ejection operation that occurs due to film boiling varies, the ejected ink amount, which is an ejection property, also varies, so that color variation tends to occur. Consequently, a recording head that has just been mounted on the inkjet recording apparatus, i.e., that is at a stage in which the sum ejection number is comparatively low, is at depletion level 1.

In depletion level 1, the threshold is set to be smaller than the below-described depletion level 2 (stable region) among the three stages. More specifically, whether the color correction parameter needs to be newly generated at the current point is determined based on the number of times ink has been ejected since the previous color correction parameter generation processing, i.e., the increase in the ejection number.

In depletion level 1, the threshold (first threshold) for comparing the increase in the ejection number until it is determined that it is necessary to execute color correction parameter generation processing, is set to be lower than the threshold (second threshold) for depletion level 2.

Consequently, the frequency, with which it is determined that it is necessary to execute the color correction parameter generation processing to be used for calibration, is set higher for a recording head having an ejection number that is at depletion level 1 than for a recording head that is at depletion level 2. The flow for determining whether it is necessary to execute the color correction parameter generation processing will be described in more detail below.

Next, depletion level 2 will be described. Depletion level 2 corresponds to a state that has progressed from the state immediately after the recording head was mounted, in which color variation tends to occur, to a state in which the ejection operation that causes film boiling is stable as a result of the reaction between the electrothermal converter and the ink. Once the ejection operation resulting from film boiling stabilizes, color variation is less likely to occur because the ejected ink amount, which is an ejection property, is also stable.

Therefore, setting the threshold (second threshold) for depletion level 2 to be greater than both depletion level 1 and the below-described depletion level 3 enables the frequency, with which it is determined that the color correction parameter generation processing needs to be executed, to be at a minimum.

Finally, depletion level 3 will be described. Depletion level 3 corresponds to a state in which the rated life of the recording head has passed. The recording head performs the ejection operation by locally heating the ink with an electrothermal converter to cause film boiling to occur. Consequently, when a predetermined number of ejection operations equal to or more than the rated life number has been performed, the film boiling may not be properly performed due to wear of the electrothermal converter.

When the ejection operation resulting from film boiling is not being properly performed, the ejected ink amount, which is an ejection property, varies, so that color variation tends to occur. Consequently, a recording head that has undergone a greater number of ejection operations than its rated life is determined as depletion level 3.

By setting the threshold used for depletion level 3 (third threshold) to be smaller than the threshold used for depletion level 2 (second threshold), the frequency, with which it is determined that color correction parameter generation processing needs to be executed, is set higher than that for depletion level 2.

Thus, the ejection count threshold table is set based on the depletion level of the recording head. This operation is performed so that the frequency that color correction parameter generation processing is executed by a stable recording head is at a minimum, as a result of the depletion level 2 threshold being set higher than both the depletion level 1 threshold and the depletion level 3 threshold. Consequently, a prediction accuracy of color variation based on changes in the recording head ejection property can be improved.

Variation in the ejection property of the recording head also occurs due to the reaction between the electrothermal converter and the ink, so that the degree of variation can differ for each ink color. Therefore, in the present exemplary embodiment, the color variation prediction accuracy is increased by setting a threshold for each ink color.

Further, in the present exemplary embodiment, although depletion levels are set, the thresholds for comparing the increase may be set based on the sum ejection number, so that when the sum is a first number, the threshold may be set to be a first value, and when the sum is a second number greater than the first number, the threshold may be set to be a second value that is greater than the first value. Similarly, when the sum is a third number greater than the second number, the threshold is a third value that is less than the second value.

FIG. 9A is a table illustrating depletion level determination results. The ink colors PC, PM, and Y are "depletion level 3", which is the highest depletion level, the ink colors BK, C, and M are "depletion level 2", and the ink color MBK is "depletion level 1", which is the lowest depletion level.

Next, in step S603, the increase in the ejection number since the previous calibration of the recording head is acquired for each ink color. If the recording head has been replaced, so that there is no calibration execution history for the recording head currently mounted in the inkjet recording apparatus, i.e., a color correction parameter has not been generated in the past with this recording head, the ejection number since the replacement of the recording head is acquired as the increase.

FIG. 10A illustrates the acquired increase in the ejection number since the previous calibration. In step S604, the increase in the ejection number since the previous calibration illustrated in FIG. 10A is compared with the respective thresholds corresponding to the depletion level for each ink color of the recording head determined as in FIG. 9A from the ejection count threshold table illustrated in FIG. 7. In the present exemplary embodiment, since the PC increase is equal to or more than the threshold (YES in step S604), the processing proceeds to step S605. In step S605, it is determined that it is necessary to execute calibration.

Next, a case in which the ejection numbers acquired in step S601 are the values illustrated in FIG. 8B will be described. Like in the above-described steps S602 and S603, referring FIG. 9B and FIG. 10B, it can be seen that in step S604 all of the seven ink colors are less than the threshold (NO in step S604). Therefore, the processing proceeds from step S604 to step S606. In step S606, it is determined that it is not necessary to execute calibration.

In the present exemplary embodiment, although it is determined that it is necessary to execute the color correction parameter generation processing when the increase in the ejection number for at least one color is equal to or more than the threshold, the present invention is not limited to this. More specifically, it can be determined that it is necessary to execute the color correction parameter generation processing when the increase in the ejection number for a predetermined number of ink colors is equal to or more than the threshold, or when the increase in the ejection number for all of the ink colors is equal to or more than the threshold.

In addition, in the present exemplary embodiment, when it is determined that it is necessary to execute the color correction parameter generation processing on at least one ink color, although the color correction parameter generation processing is executed for all of the ink colors, the recording apparatus may be configured so that calibration is performed by executing the color correction parameter generation processing only on inks determined to need such processing.

Figure 11:
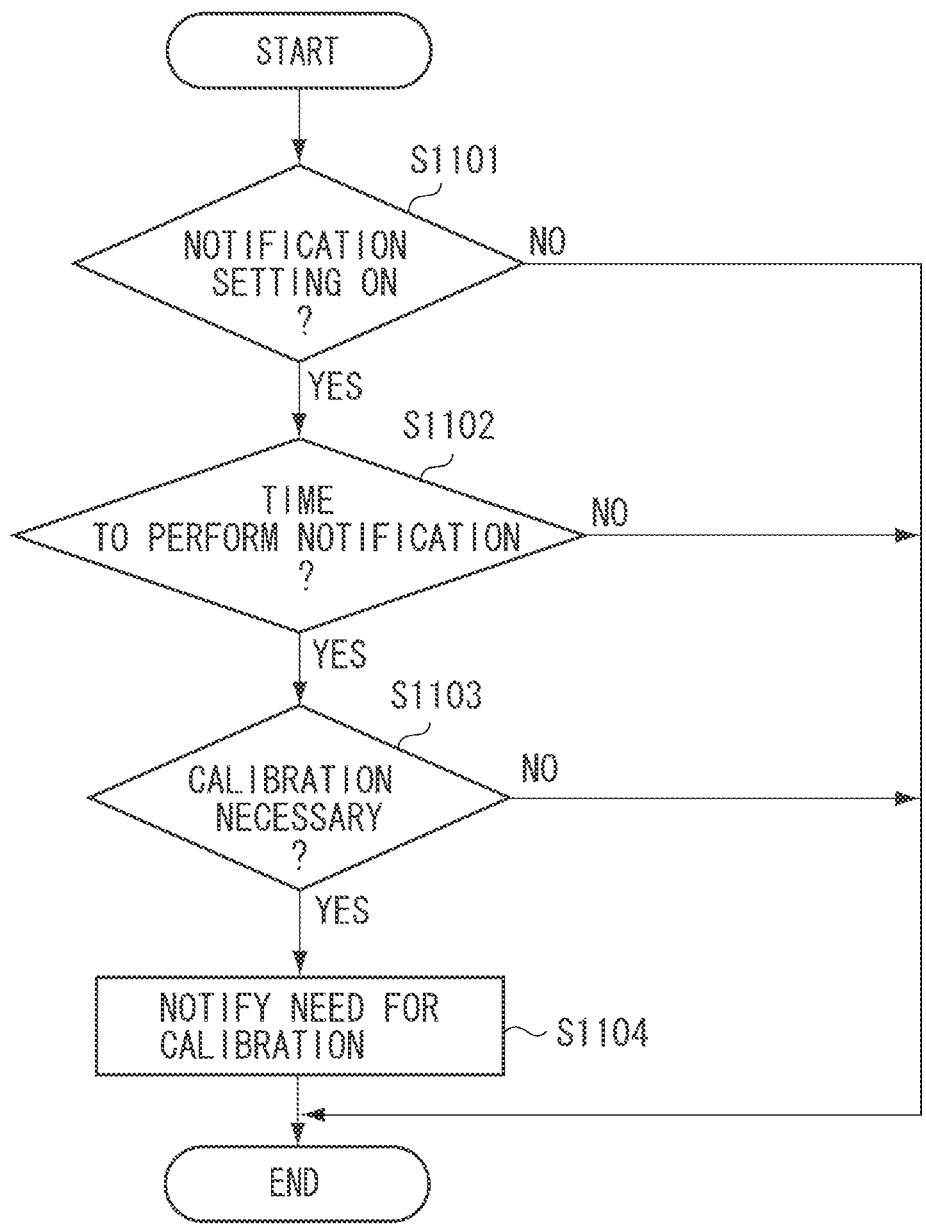
FIG. 11 is a flowchart for notifying the user of the need for calibration.

FIG. 11 is a flowchart for notifying the user of the need for calibration.

In step S1101, it is determined whether the calibration notification setting is ON. In the present exemplary embodiment, the user can select whether the user is notified of the need for calibration.

If the notification setting is OFF (NO in step S1101), since the user does not wish to be notified of the determination result of the need for calibration, regardless of whether calibration is necessary or not, the processing is finished without sending a notification. If the notification setting is ON (YES in step S1101), the processing proceeds to step S1102.

In step S1102, it is determined whether it is time to send a calibration notification. In the present exemplary embodiment, it is determined that it is time to send a calibration notification (YES in step S1102) when the power is turned ON, when the recording head has been replaced, when the recording medium has been set in the apparatus, and when the print job has finished. In such a case, the processing proceeds to step S1103.

In cases other than the above (NO in step S1102), the processing is finished without sending a notification.

In step S1103, the determination result regarding whether it is necessary to execute the color correction parameter generation processing that was internally determined based on the flow illustrated in FIG. 6 is read. If it is determined that the color correction parameter generation processing is not necessary (NO in step S1103), the processing is finished without sending a notification. If it is determined that the color correction parameter generation processing is necessary (YES in step S1103), the processing proceeds to step S1104. In step S1104, the user is notified of the fact that calibration is necessary, and the processing is finished.

The important thing is that the need for calibration can be determined based on the depletion level of the recording head from the calibration execution history and the recording head ejection history. The method for determining the depletion level is not limited to the method described in the present exemplary embodiment.

As described in steps S601 and S602, in the present exemplary embodiment, the depletion level of the recording head is determined using the sum ejection number when the color correction parameter generation processing was previously executed. However, the present invention is not limited to this method. For example, the depletion level of the recording head may be determined based on the sum ejection number when the need for calibration is determined.

FIG. 12 illustrates a screen notifying the user that calibration needs to be executed. In the present exemplary embodiment, the notification that calibration is necessary is displayed on an operation panel of the inkjet recording apparatus.

Other configurations may also be employed, as long as the user can be notified of the fact that calibration is necessary. For example, the notification can be displayed on a driver screen, or sent in an email via a network. Further, the timing for notifying the user is not limited to that described above. For example, the notification may be sent during the print job.

In the present exemplary embodiment, the sum ejection number of the recording head is stored in a memory included in the recording head. Therefore, the number of ink droplets ejected by the recording head until this point is stored even if the recording head is removed from the apparatus during use.

Further, the counted ejection number of the number of ejected ink droplets since the recording head was mounted in the recording apparatus body may be stored in a memory in the recording apparatus body.

As described above, in the present exemplary embodiment, the depletion level of the recording head is set for each of a plurality of ink colors based on the sum ejection number when the generation processing for generating the color correction parameter to be used for calibration was previously executed, and the increase in the ejection number is compared with a predetermined threshold.

Consequently, before ejection from the recording head is stabilized, the frequency, with which it is determined that the color correction parameter needs to be generated by executing calibration, is higher than that when ejection is stable.

In addition, when the recording head life draws near, so that ejection is no longer stable, it is more frequently determined that calibration is necessary than when ejection is stable.

In the present exemplary embodiment, when the interval is short between determinations that calibration is necessary based on a dot-count of the ejection number of ink droplets, it is referred to as "high frequency". Based on such a configuration, the color variation prediction accuracy can be further increased by determining whether it is necessary to execute the color correction parameter generation processing without consuming the recording medium or ink. As a result, color variation can be suppressed while reducing the number of recordings and color measurements of the test pattern.

A second exemplary embodiment is characterized in that an ejection rate of the ink ejected from the recording head is used to determine the need to generate the color correction parameter to be used in calibration.

Figure 13:
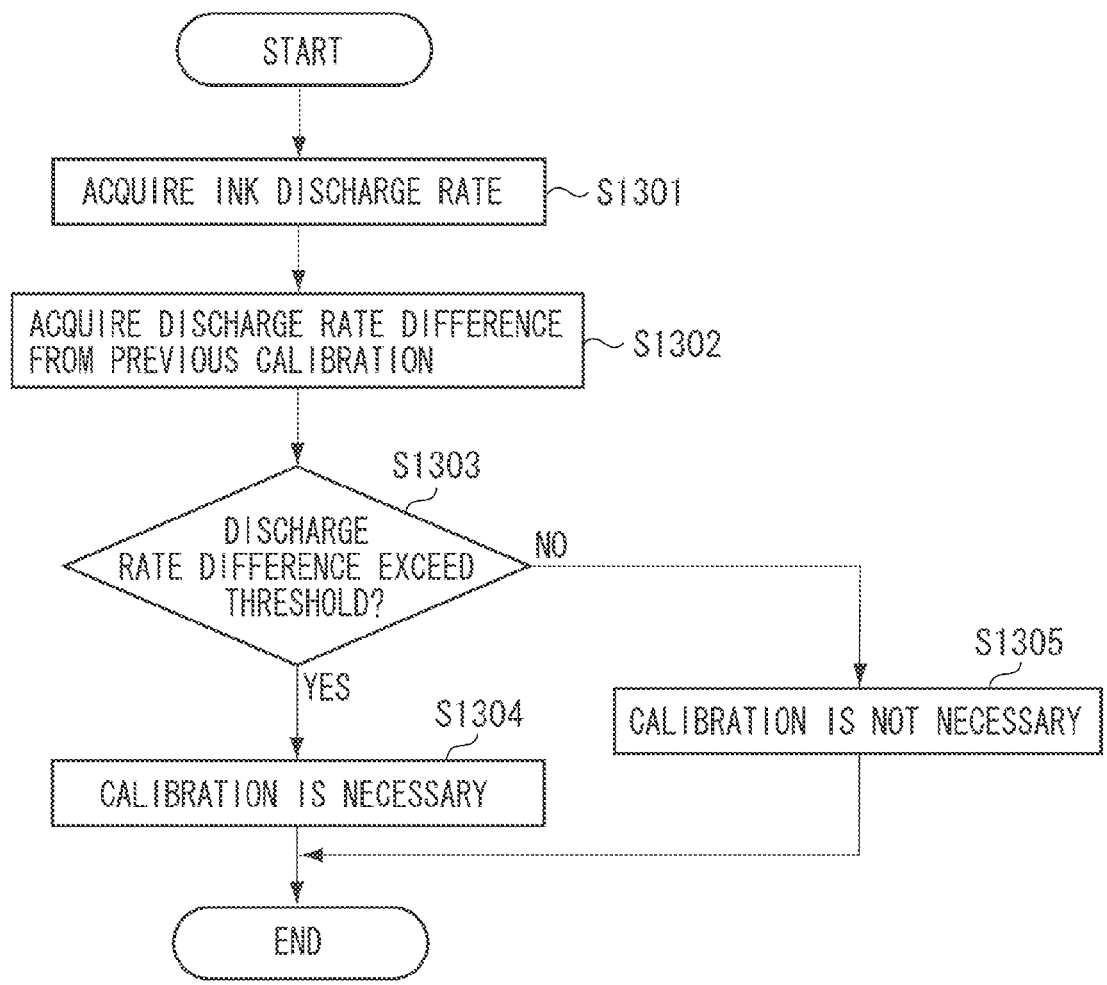
FIG. 13 is a flowchart for determining the need for calibration according to a second exemplary embodiment.

FIG. 13 is a flowchart for internally determining the need for color correction parameter generation processing according to the present exemplary embodiment. In step S1301, the ejection rate of the ink ejected from the recording head is acquired for each ink color.

An example of the method for detecting the ejection rate is a method in which ink is ejected onto an optical axis arranged at a fixed distance from the recording head, and the rate is measured based on the ejection time and the time that the ink passed through the optical axis. FIG. 15A illustrates a table of ink ejection rates acquired for each of a plurality of ink colors.

In step S1302, the ejection rate detected when the color correction parameter generation processing was previously executed is acquired, and the difference with the ejection rate acquired in step S1301 is determined. In the present exemplary embodiment, the ejection rate is detected when the recording head is replaced (at mounting), and the difference in ejection rates is taken as an absolute value.

If the recording head has been replaced, so that there is no execution history of color correction parameter generation processing for the recording head currently mounted in the inkjet recording apparatus, the difference with the ejection rate when the recording head was replaced is acquired. FIG. 16A illustrates absolute values of the difference between the ejection rate during the previous calibration and the ejection rate acquired this time.

Figure 14:
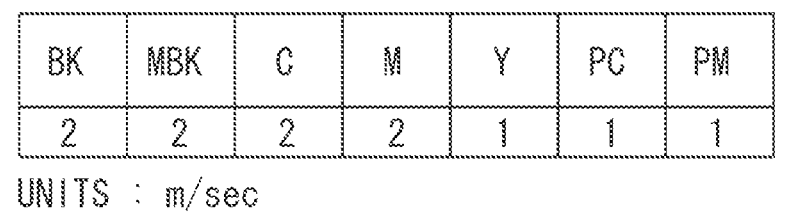

In step S1303, the difference in the ejection rate illustrated in FIG. 16A for each of the plurality of ink colors since the previous execution of color correction parameter generation processing, is compared with a predetermined threshold. FIG. 14 is an ejection rate difference threshold table illustrating this threshold.

The ejection rate difference threshold table illustrated in FIG. 14 is configured to be able to set different values for each ink color. This is because the effect on color variation due to changes in the ejection rate of the recording head varies depending on the ink.

The PC ink and the PM ink used in the present exemplary embodiment have a lower color material density included in the respective inks than the C ink and the M ink. Further, since the low-density inks (PC and PM) and Y ink have a greater effect on the color variation due to the ejection rate, the threshold for the low-density inks is set smaller than that for the high-density inks (C and M) and the BK and MBK inks, which have a comparatively small effect on color variation.

Consequently, the prediction accuracy of color variation is further enhanced. In the present exemplary embodiment, since the difference in the PC ejection rate is equal to or more than the threshold (YES in step S1303), the processing proceeds to step S1304. In step S1304, it is determined that it is necessary to execute calibration. Further, in the present exemplary embodiment, although the absolute value of the ejection rate difference is determined and compared with the threshold, the comparison may be performed based on an ink property or a recording head ejection property, without determining an absolute value.

Next, a case in which the ejection rates acquired in step S1301 are the values illustrated in FIG. 15B will be described. Like in step S1302, referring to FIG. 16B, it can be seen that in step S1303 the ejection rates of all the seven ink colors are less than the threshold (NO in step S1303). Therefore, the processing proceeds from step S1303 to step S1305. In step S1305, it is determined that it is not necessary to execute the color correction parameter generation processing. Therefore, as in the first exemplary embodiment, notification to the user of calibration is performed based on the thus-determined need for calibration.

Thus, in the present exemplary embodiment, by detecting the recording head ejection rate to predict color variation, the prediction accuracy can be enhanced more than that in the first exemplary embodiment. Further, ink consumption can also be suppressed to a minimum, and the burden on the user can be reduced as much as possible. As a result, the need for calibration can be determined more accurately, and color variation can be suppressed while reducing the number of recordings and color measurements of the test pattern.

Figure 17:
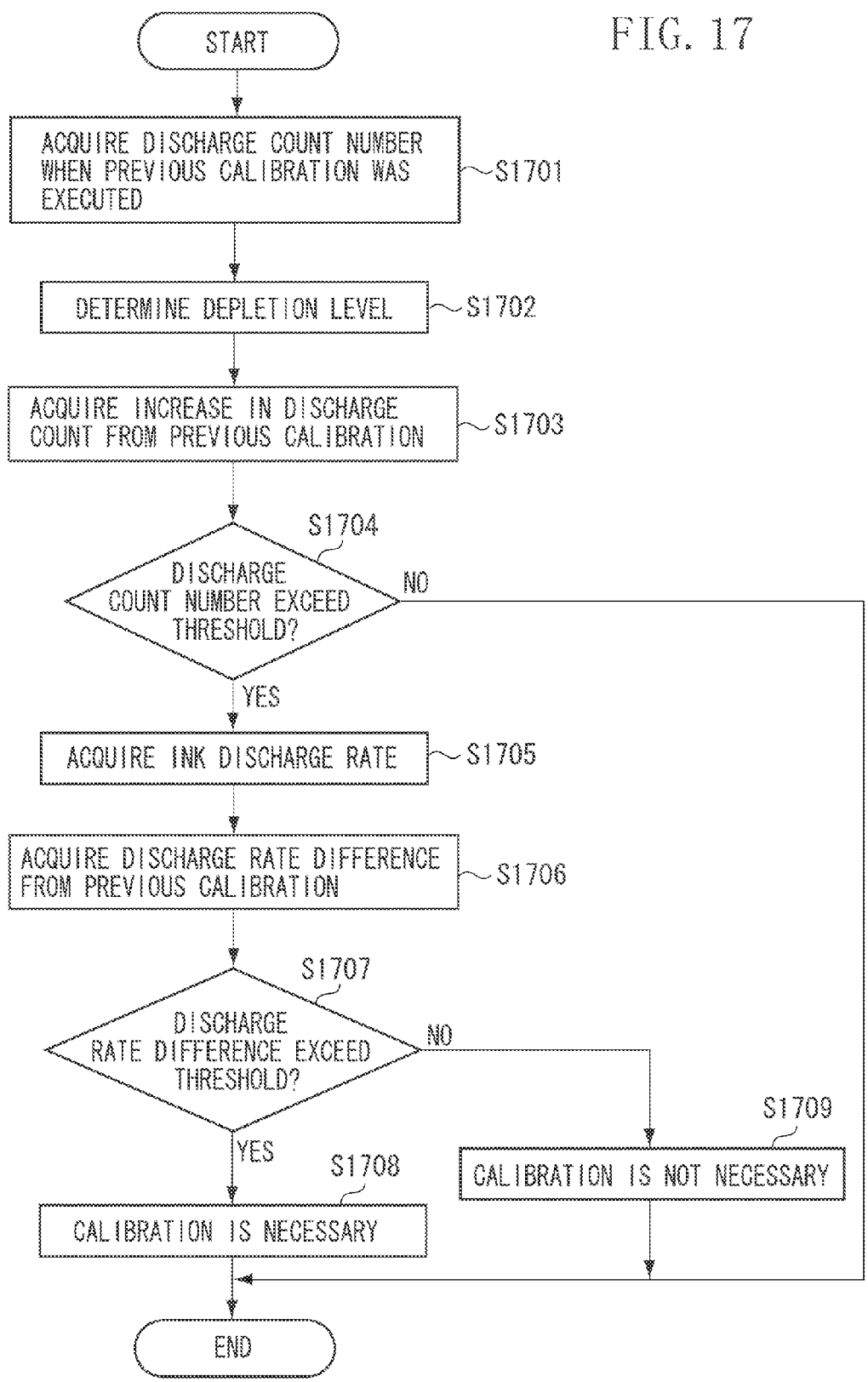
FIG. 17 is a flowchart for determining the need for calibration according to a third exemplary embodiment.

A third exemplary embodiment is characterized in that, in addition to the configuration of the second exemplary embodiment, the frequency for detecting the ejection rate is changed based on the depletion level of the recording head. FIG. 17 illustrates a flow for determining the need for color correction parameter generation processing according to the present exemplary embodiment.

In step S1701, the sum ejection number from all of the ejection ports in the recording head when calibration was previously executed, i.e., when the previous color correction parameter was generated, is acquired for each ink color. Next, in step S1702, the recording head depletion level is determined based on the acquired sum ejection number for each color and an ejection rate detection timing threshold table illustrated in FIG. 18.

The tendency for color variation due to the depletion level is the same as that in the first exemplary embodiment. Thus, at depletion level 1, in which color variation tends to occur, the ejection rate detection operation for confirming color variation is frequently performed, as described in the following steps. Consequently, by increasing the color variation confirmation frequency, color variation can be suppressed even in regions where color variation tends to occur.

At depletion level 2, which is a stable region in which color variation does not tend to occur, the frequency of the ejection rate detection operation for confirming color variation is reduced. Further, at depletion level 3, in which color variation tends to occur, the ejection rate detection operation performed for confirming color variation is frequency performed, so that the color variation confirmation frequency is increased.

In step S1703, the increase in the ejection number since the ejection rate was previously detected is acquired for each ink color. In step S1704, the increase in the ejection number acquired in step S1703 is compared with the respective thresholds corresponding to the depletion level for each ink color in the recording head, by referring to the ejection rate detection timing threshold table of FIG. 18.

If the increase in the ejection number is equal to or more than the threshold (YES in step S1704), it is determined that it is time to detect the ejection rate, and the processing proceeds to step S1705. In step S1705, the ejection rate of the ink ejected from the recording head is acquired for each ink color. In step S1706, the absolute value of the difference in the ejection rate of the recording head with that when the color correction parameter generation processing was previously executed, is acquired for each ink color.

In step S1707, the absolute value of the difference in the ejection rate for each ink color acquired in step S1706 is compared with a threshold based on the ejection rate difference threshold table. If it is determined that the difference in the ejection rate is equal to or more than the threshold (YES in step S1707), the processing proceeds to step S1708. In step S1708, it is determined that it is necessary to execute color correction parameter generation processing.

If it is determined that the difference is less than the threshold (NO in step S1707), the processing proceeds to step S1709. In step S1709, it is determined that it is not necessary to execute the color correction parameter generation processing. If it is determined in step S1704 that the increase in the ejection number is less than the threshold for all seven ink colors (NO in step S1704), it is determined that it is not the time to detect the ejection rate, and the processing is finished.

Thus, in the present exemplary embodiment, in addition to the configuration of the second exemplary embodiment, the frequency for detecting the ejection rate is changed based on the depletion level of the recording head. As a result, wasteful ejection rate detection operations can be omitted. As a result, in addition to the advantageous effects of the second exemplary embodiment, the burden on the user can be reduced even further.

In the present exemplary embodiment, if in step S1704 the increase in the ejection number is equal to or more than the threshold, the subsequent determinations in steps S1705 to S1707 are performed based on the ejection rate. However, the present invention is not limited to this. For example, if in step S1704 the ejection count number is equal to or more than the threshold, it can be determined that the color correction parameter generation processing is necessary, and if in step S1704 the ejection count number is not equal to or more than the threshold, the determinations in step S1705 to S1707 can be performed based on the ejection rate.

In this case, among the determinations made based on the ejection number and the determinations made based on the ejection rate, if it is determined in at least one of these determinations that the color correction parameter generation processing is necessary, a notification is sent to the user. Consequently, the calibration frequency is higher than that for the above-described configurations.

Further, in the above exemplary embodiments, although a notification is sent to the user when it is determined that color correction parameter generation processing is necessary, the present invention is not limited to this. For example, the recording apparatus may further include a second determination unit that automatically performs printing and color measurement on the test pattern to determine whether to perform color correction parameter generation processing.

In addition, the recording apparatus may also be configured so that, after it is determined that color correction parameter generation processing is necessary, the test pattern is printed and subjected to color measurement, and based on the measurement result, it is re-determined whether to execute the color correction parameter generation processing.

Moreover, in the above exemplary embodiments, although the respective flows were executed by the main control unit 200 in the inkjet recording apparatus, the present invention is not limited to this. For example, these processes may be executed by the host computer 217 connected to the recording apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-016349 filed Jan. 28, 2011, which is hereby incorporated by reference herein in its entirety.

What is claimed is:

1. A method for generation of a color correction parameter at plural times for a recording apparatus that records an image on a recording medium by a recording unit, the method being executed by a processor which is coupled to the recording apparatus, the method comprising:
    a first acquiring step for acquiring first information regarding a number of dots counted by a counting unit from a timing at which the recording unit was set in the recording apparatus;
    a first determining step for determining a threshold value based on the number of dots indicated by the first information acquired by the first acquiring step;
    a second acquiring step for acquiring second information regarding a number of dots counted by a counting unit from a timing of generation of previous color correction parameters;
    a second determining step for determining that it is necessary to generate subsequent color correction parameters in the case where the number of dots indicated by the second information acquired by the second acquiring step is greater than the threshold value determined by the first determining step;
    a notifying step for notifying a user of a result of the second determining step in the case where it is determined that it is necessary to generate the subsequent color correction parameters; and
    a patch recording step for causing the recording unit to record a plurality of patches.

2. The method according to claim 1, wherein the first determining step determines the threshold value such that (i) in the case where the number of dots indicated by the first information acquired by the first acquiring step is less than a first number, the threshold value is a first value, and (ii) in the case where the number of dots indicated by the first information acquired by the first acquiring step is greater than the first number, the threshold value is a second value that is greater than the first value.

3. The method according to claim 2, wherein the first determining step determines the threshold value such that (i) in the case where the number of dots indicated by the first information acquired by the first acquiring step is less than a second number that is greater than the first number, the threshold value is the second value, and (ii) in the case where the number of dots indicated by the first information acquired by the first acquiring step is greater than the second number, the threshold value is a third value that is less than the second value.

4. The method according to claim 3, wherein the first value is less than the third value.

5. The method according to claim 1, further comprising:
    a generating step for generating the color correction parameters by measuring the patches recorded by the recording unit, in the case where a result of the second determining step indicates that it is necessary to generate the color correction parameters.

6. The method according to claim 1, wherein the recording unit can apply a plurality of colors of recording materials on the recording medium, and wherein the second determining step is executed for each of the plurality of colors.

7. The method according to claim 6, wherein in the case where a result of the second determining step indicates that it is necessary to generate the subsequent color correction parameters for at least one of the plurality of colors, the generation of the subsequent color correction parameters is executed for all colors.

8. The method according to claim 1, wherein the counting unit counts a number of dots of image data to be recorded or a number of times that recording elements included in the recording unit are driven.

9. The method according to claim 1, wherein the notifying step further displays information corresponding to the result.

10. The method according to claim 1, wherein the recording unit records the image by applying ink on the recording medium.

11. The method according to claim 1, wherein
    the first acquiring step acquires the first information regarding a number of dots counted by the counting unit from the timing of the recording unit was set in the recording apparatus to the timing of previous generation of the color correction parameters.

12. The method according to claim 1, wherein
    the second acquiring step acquires the second information regarding a number of dots counted by the counting unit from the timing of previous generation of color correction parameters to a timing of acquiring the second information by the second acquiring step.

13. The method according to claim 1, further comprising:
    a generating step for generating the subsequent color correction parameters based on the plurality of patches recorded by the patch recording step.

14. The method according to claim 1, wherein
    the previous color correction parameters are generated based on a plurality of patches.

15. A recording apparatus that records an image on a recording medium, and generates a color correction parameter at plural times, the recording apparatus comprising:
    a recording unit for recording the image, and
    a processor and a memory coupled to the processor, the processor and the memory operating to execute the following:
    acquiring first information regarding a number of dots counted by a counting unit from a timing at which the recording unit was set in the recording apparatus;
    determining a threshold value based on the number of dots indicated by the first information;
    acquiring second information regarding a number of dots counted by a counting unit from a timing of generation of previous color correction parameters;
    determining that it is necessary to generate subsequent color correction parameters in the case where the number of dots indicated by the second information is greater than the determined threshold value;

notifying a user of a result of the determination in the case where it is determined that it is necessary to generate the subsequent color correction parameters; and causing the recording unit to record a plurality of patches.

16. The recording apparatus according to claim 15, wherein the processor and the memory further execute determining the threshold value such that (i) in the case where the number of dots indicated by the first information is less than a first number, the threshold value is a first value, and (ii) in the case where the number of dots indicated by the first information is greater than the first number, the threshold value is a second value that is greater than the first value.

17. The recording apparatus according to claim 16, wherein the processor and the memory further execute determining the threshold value such that (i) in the case where the number of dots indicated by the first information is less than a second number that is greater than the first number, the threshold value is the second value, and (ii) in the case where the number of dots indicated by the first information is greater than the second number, the threshold value is a third value that is less than the second value.

18. The recording apparatus according to claim 15, wherein the recording unit can apply a plurality of colors of recording materials on the recording medium, and wherein the processor and the memory further execute determining that it is necessary to generate subsequent color correction parameters for each of the plurality of colors.

19. The recording apparatus according to claim 18, wherein the processor and the memory further execute determining that it is necessary to generate subsequent color correction parameters for all colors in the case where a result of the determining indicates that it is necessary to generate the subsequent color correction parameters for at least one of the plurality of colors.

20. The recording apparatus according to claim 15, wherein the processor and the memory further execute the following:

generating the subsequent color correction parameters based on the plurality of recorded patches.

21. A method for generation of a color correction parameter at plural times for a recording apparatus that records an image on a recording medium by a recording unit, the method being executed by a processor which is coupled to the recording apparatus, the method comprising:

a first acquiring step for acquiring a first information regarding a number of dots counted by a counting unit from a timing at which the recording unit was set in the recording apparatus;

a first determining step for determining a threshold value based on the number of dots indicated by the first information acquired by the first acquiring step;

a second acquiring step for acquiring a second information regarding a number of dots counted by a counting unit from a timing of generation of previous color correction parameters;

a second determining step for determining that it is necessary to generate subsequent color correction parameters in the case where the number of dots indicated by the second information acquired by the second acquiring step is greater than the threshold value determined by the first determining step;

a patch recording step for causing the recording unit to record a plurality of patches in the case where it is determined that it is necessary to generate the subsequent color correction parameters by the second determining step; and a generating step for generating the subsequent color correction parameters based on the plurality of patches recorded by the patch recording step.

* * * * *